United States Patent Office 3,432,599
Patented Mar. 11, 1969

3,432,599
ORGANOPHOSPHORUS INSECTICIDES
Johannes T. Hackmann, Herne Bay, Kent, England, assignor to Shell Oil Company, New York, N.Y., a corporation of Delaware
No Drawing. Filed July 20, 1960, Ser. No. 43,979
Claims priority, application Great Britain, July 22, 1959, 25,156/59
U.S. Cl. 424—203
Int. Cl. A01n 9/36; C07f 9/08
8 Claims This invention relates to novel phosphorus-containing esters, valuable as insecticides, and suitable in particular for use as plant-protecting agents.

These new insecticides are the esters of alpha-hydroxy-lactones with phosphoric acid diesters. The new insecticides thus are triesters of phosphoric acid wherein one of the ester groups is a lactone group, the lactone group being joined from the alpha carbon atom thereof—the carbon atom immediately adjacent to the carbonyl carbon atom of the lactone ring—via oxygen or sulfur to the phosphorus atom.

The preferred esters of this new class are those having the general formula:

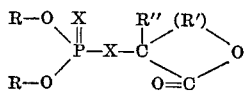

wherein R' represents a multivalent group bonding the indicated carbon atom to the indicated oxygen atom by from two to three carbon atoms, R" is hydrogen, halogen, a group represented by R, one bond of an olefinic double bond to a carbon atom of the group R', which forms a part of the lactone ring, or one bond of a multivalent group which forms a separate ring with one or more atoms of the group R' which are not involved in the lactone ring, each of R taken singly represents a monovalent organic group—which may be the same group, different groups of the same kind, or different kinds of groups—which is the residue of an alcohol, ROH, and taken together in combination represent a divalent organic group which is the residue of a glycol HO—R—OH, and each X represents oxygen or sulfur, the two atoms X being the same, or being different.

Preferably, R represents hydrocarbon of up to ten carbon atoms—that is to say, each of R may be a separate monovalent hydrocarbon group, both of the groups together containing up to 10 carbon atoms, or both of R' together may be a single divalent hydrocarbon group of up to 10 carbon atoms—or such hydrocarbon groups substituted by one or more halogen atoms. The monovalent groups may suitably be straight chain, branched chain or cyclic in configuration; they may be saturated, olefinically unsaturated or aromatically unsaturated. Preferably, they are free from acetylenic unsaturation. Suitable groups thus include the alkyl groups, the cycloalkyl groups, alkylene groups, aralkyl groups, alkaryl groups, aryl groups, alkenyl groups, alkadienyl groups, cycloalkenyl groups, alkenylene groups, aralkenyl groups, alkenylaryl groups, and the like. The most useful of the new class of compounds are believed to be those wherein R represents saturated aliphatic hydrocarbon—that is, alkyl where each R is a separate monovalent group, or alkylene where both of R together represent a single divalent group—of up to eight carbon atoms—or halogen substituted saturated aliphatic hydrocarbon. Where both of R together represent an alkylene group, it is preferred that there be from two to three carbon atoms in the chain bonding together the indicated oxygen atoms. While the term "halogen" used herein is intended to include all of the four halogen atoms, the middle halogens—i.e., bromine and chlorine—are preferred.

The group R' joins together the indicated carbon atom and the indicated oxygen atom of the lactone ring with two to three carbon atoms, the resulting structure being saturated or containing olefinic, but preferably not acetylenic, unsaturation. The group R' thus can be saturated aliphatic and hydrocarbon, or substituted hydrocarbon, in character—for example, R' can be alkylene, haloalkylene, nitro-alkylene, alkoxyalkylene, aminoalkylene, aryl-substituted alkylene, aralkyl-substituted alkylene, or the like—or it can be olefinically unsaturated—as for example the alkenylene, haloalkenylene, and like groups—or it can together with the indicated carbon atom of the lactone ring form an olefinic unsaturation. Also, the group R' can be cyclic, two to three carbon atoms of the ring thereof also forming part of the indicated lactone ring. Preferably, because of the desirable properties of the resulting esters, the group R' contains not more than 10 carbon atoms.

The most actively insecticidal of the new lactone esters—and accordingly, the preferred subgenus of those esters—are those wherein the groups R are each alkyl of from 1 to 6 carbon atoms, X represents oxygen, R" is hydrogen and R' is the ethylene group, these esters having the formula:

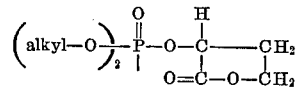

wherein alkyl represents the alkyl group of from 1 to 6 carbon atoms.

Typical lactone esters of this invention include the dimethyl hydrogen phosphate ester of 3-hydroxy-tetrahydrofuran-2-one, the methyl ethyl hydrogen phosphate ester of 3-hydroxy-4,4,5-tetrahydrofuran-2-one, the dibenzyl hydrogen phosphate ester of 3-hydroxy-tetrahydropyran-2-one, the dimethyl hydrogen phosphate ester of 3-hydroxy-coumarin-2-one, the methyl phenyl hydrogen phosphate ester of 3-hydroxycoumarin, and the like.

The phosphoric acid esters of this invention are readily prepared in many cases by reacting the diester phosphorohalogenate of the formula:

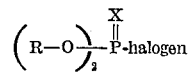

with the alpha-hydroxy lactone, of the formula:

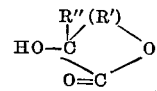

wherein the symbols have the respective meanings already set out herein. Thus for example suitable phosphorus compounds which may be used include diethylphosphorochloridate or diethylphosphorothionochloridate and the corresponding diethyl or ethyl methyl or diisopropyl or methyl isopropyl or ethyl isopropyl or di-n-butyl or ethyl-n-butyl phosphorochloridates and phosphorothionochloridates. Suitable alpha-hydroxy lactones which may be used in the preparation of the novel phosphorus compounds of the present invention by the above-mentioned process include 3-hydroxy-tetrahydrofuran-2-one, 3-hydroxy-4,4,5-trimethyl tetrahydrofuran-2-one, 3-hydroxy-tetrahydropyran-2-one and 3-hydroxy-coumaran-2-one.

Preferably the halogenate is the chloridate, and the reaction is carried out in the presence of a basic substance, such as, for example, an organic base such as pyridine or lutidine, the basic material being present to absorb hydrogen halide which is formed during the reaction of the halogenate with the lactone. The reaction preferably is carried out under substantially anhydrous conditions, and in an inert solvent such as an ether, a liquid halogenated hydrocarbon such as carbon tetrachloride, an aromatic compound such as benzene, toluene or a xylene, or mixtures thereof, or a light petroleum fraction. If either or both of the reactants are liquid, a solvent may be omitted, however. The lactone ester product is readily recovered by filtering off any solid material present, then removing any solvent that may be present in the filtrate.

Esters of this invention wherein the lactone ring is bonded via sulfur to the phosphorus atom are readily prepared by reacting the suitable sulfenyl halide, preferably chloride, of the formula

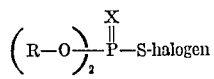

with an unsaturated lactone wherein the unsaturation is in the 3,4-position, such lactone having the formula

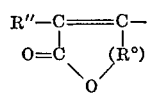

wherein R, R″ and X have the respective meanings already set out herein, and R° together with the indicated carbon atom bonded thereto, represents the group R′.

In the reaction of the sulfenyl halide and unsaturated lactone, the sulfenyl halide adds across the double bond, giving the lactone esters of the invention wherein the halogen atom of the sulfenyl halide is bonded to the carbon atom in the number four position of the lactone ring. If desired, the chlorine can be removed and replaced with a suitable other grouping by known methods for replacing halogen.

Suitable unsaturated lactones which may be used to prepare novel phosphorus compounds of the present invention include 5-methyl-2,5-dihydrofuran-2-one, coumarin, 5,6-dihydropyran-2-one, and crotonolactone.

The reaction of the sulfenyl halide with the unsaturated lactone is conducted in the same manner as is the reaction of phosphorohalogenate with hydroxy-lactone, and recovery of the lactone ester product is effected in much the same way.

The following examples illustrate the novel compounds of the invention and their preparation, the parts by weight (p.b.w.) and parts by volume (p.b.v.) bearing the same relation as the kilogram bears to the liter.

Example I.—Preparation of 3-diethoxyphosphinothioyl-oxytetrahydrofuran-2-one 86 p.b.w. of 3-hydroxytetrahydrofuran-2-one and 188.5 p.b.w. of diethylphosphorothionochloridate were mixed together and to this mixture 79 p.b.w. of pyridine was added gradually with stirring. The temperature rose to 50° C. and when the exothermic reaction had ceased the mixture was heated to 70° C. in a water bath for 30 minutes. After standing overnight the reaction mixture was taken up in ether and washed with water and dried over anhydrous magnesium sulfate. The ether and unreacted starting material were removed by distillation at reduced pressure and the residue consisted of 3-diethoxyphosphinothioyloxytetrahydrofuran-2-one, a pale yellow oil, $n_D^{20}=1.4921$.

Analysis (percent w.).—Theoretical: C, 37.8; H, 5.9; S, 12.6. Found: C, 38.2; H, 5.9; S, 13.0. Yield: 212 p.b.w. (89% of theoretical).

Example II.—Preparation of 3-diethoxyphosphinyloxy-tetrahydrofuran-2-one

Following the same procedure as described above except that an equimolecular proportion of diethylphosphorochloridate was used in place of the diethylphosphorothionochloridate, a 60% yield of 3-diethoxyphosphinyloxytetrahydrofuran-2-one was obtained. This compound was a pale yellow oil, $n_D^{20}=1.4380$.

Analysis (percent w.).—Theoretical: C, 40.3; H, 6.3; P, 13.0. Found: C, 39.8; H, 6.4; P, 13.2.

Example III.—Preparation of 3-diethoxyphosphinyloxy-4,4,5-trimethyltetrahydrofuran-2-one Following the same procedure as described in Example II except that an equimolecular proportion of 3-hydroxy-4,4,5-trimethyltetrahydrofuran-2-one was used in place of 3-hydroxytetrahydrofuran-2-one, a 71% yield of 3-diethoxyphosphinyloxy-4,4,5-trimethyl-tetrahydrofuran-2-one was obtained. This was a pale yellow oil, $n_D^{22}=1.441$.

Analysis (percent w.).—Theoretical: C, 47.1; H, 7.5; P, 11.1. Found: C, 46.8; H, 7.6; P, 11.5.

Example IV.—Preparation of 3-diethoxyphosphinothio-yloxy-4,4,5-trimethyl-tetrahydrofuran-2-one Using the same procedure as described in Example I except that an equimolecular proportion of 3-hydroxy-4,4,5-trimethyltetrahydrofuran-2-one was used in place of the 3-hydroxytetrahydrofuran-2-one, a 76% yield of 3-diethoxyphosphinothioyloxy-4,4,5-trimethyltetrahydrofuran-2-one was obtained which was a pale yellow liquid, $n_D^{20}=1.4991$.

Analysis (percent w.).—Theoretical: C, 44.6; H, 7.1; S, 10.8. Found: C, 44.9; H, 7.2; S, 10.4.

The lactone esters provided by this invention are characterized by high toxicity toward insects, so that the invention also includes insecticidal compositions containing those esters.

Since these insecticidal compositions exhibit substantially no toxicity toward plant life, they can be effectively used for eradication of insects and similar pests and for protection of plant life against the ravages of insects. By the term "insects" is meant not only the members of the class Insecta, but also related to similar organisms belonging to allied classes of arthropods, and including mites, ticks, spiders, wood lice, and the like.

The new insecticidal compositions include liquid solutions and dispersions of the active ingredients in a suitable liquid carrier, these compositions being suitable for application in the form of sprays or dips, or by means of brushing. Suitable liquid carriers are those which are well known in the art to be non-toxic to plants, and include such materials as kerosene, or similar light mineral oil distillates of intermediate viscosity and volatility. In addition to such carriers, other adjuvants may be employed to enhance the effectiveness of the toxic materials. Such other adjuvants include spreading or wetting agents such as fatty acid soaps, rosin salts, saponins, gelatin, casein, or other proteinaceous material, or synthetic wetting agents of the type of sulfates of long-chain fatty alcohols, alkyl aryl sulfonates, long-chain alkyl sulfonates, phenol-ethylene oxide condensates, $C_{12}$ to $C_{20}$ amines, and the like. The solution of the toxic material my be dispersed or emulsified in water, and the resulting dispersion or emulsion applied as the spray.

The new insecticidal compositions may be in the form of finely divided solids, the active material being combined with a finely divided solid carrier such as talc, bentonite, lime, gypsum, pyrophillite or the like. The compositions may also contain sticking agents, emulsifying agents, or other materials which enhance the effectiveness of the toxic materials.

If desired, the composition may be in the form of an aerosol, the toxic material being dispersed into the air, or atomized into a spray, by means of a compressed gas.

The concentration of toxic material in the insecticidal compositions will depend on many factors, such as the particular toxic material or materials which are used, the carrier used, the method and conditions of application, the insect species to be controlled, etc., the proper consideration of these factors being within the skill of those versed in the art. In general, the toxic materials hereinbefore-described will be effective in concentrations of from about 0.01% to about 0.5% by weight, based upon the total weight of the composition, although, depending upon the circumstances, as little as about 0.001% or as much as 2% or even more of the toxic material may be employed effectively.

In the new compositions, the toxic agents hereinbefore-described may be employed as the sole toxic ingredient, or they may be employed in conjunction with other insecticidally active materials. Such other insecticidally active materials include, without being limited to, the naturally occurring insecticides, such as pyrethrum, rotenone, sabidilla, and the like, as well as synthetic materials such as compounds of arsenic, lead, and/or fluorine; DDT, benzene hexachloride, thiodiphenylamine, cyanides, O,O-diethyl-O-p-nitrophenyl thiophosphate, azobenzene, and the like.

The formulation and use of insecticidal compositions of this invention is illustrated in the following examples, which illustrate the preparation and use of typical insecticidal compositions of this invention.

A 1% by weight solution in acetone of each of the compounds of Examples I through IV was prepared.

The solution was applied topically to twenty adult female house flies, *Musca domestica*, at the rate of 0.01 milliliter of solution per fly.

To 100 milliliters of water containing 0.1 milliliter of the test solution were added twenty mosquito larvae, *Aedes aegypti* (yellow fever mosquito).

Hardened filter paper, 9 centimeters in diameter, was placed in a petri dish and evenly impregnated with 1 milliliter of the test solution and the solvent allowed to evaporate. Four adult male German cockroaches, *Blatella germanica*, were exposed to one paper, and ten adult flour beetles, *Tribolium confusum*, to another.

In tests against diamond-back moth larvae, *Plutella maculipennis* (Curtis), and pea aphids, *Acyrthosiphon pisum* (Harns), turnip and broad bean plants, trimmed to one leaf each, were sprayed on the under surface of the leaf with a 0.7% by weight suspension of the chemical in a 0.05% by weight aqueous solution of Triton TX-100 as wetting agent, prepared in a micro-wet grinder. Spraying was effected with a ceramic-type spray gun delivering 39 gallons per acre at 40 pounds per square inch pressure, the plants passing under the spray on a moving belt. Ten moth larvae and ten aphids respectively were placed on the sprayed leaves and each plant then enclosed in a glass cylinder fitted at one end with a muslin cap.

In tests against red spider mite, *Tetranychus telarius* (Linn.), discs 3 centimeters in diameter cut from previously infested French bean leaves were placed on damp filter paper and sprayed at the same time as the turnips and bean plants.

In all these tests, mortality counts were made 24 and 48 hours later. The results of these tests are summarized in the following table, where A denotes 100% kill of the test insects.

| Name of chemical | Musca domestica | Blatella germanica | Tribolium confusum | Aedes aegypti larvae | Plutella maculipennis | Acyrthosiphon pisum | Tetranychus telarius |
|---|---|---|---|---|---|---|---|
| 3-diethoxyphosphinothioyloxytetrahydrofuran-2-one | A | A | A | A | A | A | A |
| 3-diethoxyphosphinyloxytetrahydrofuran-2-one | A | A |  |  |  | A |  |
| 3-diethoxyphosphinyloxy-4,4,5-trimethyl-tetrahydrofuran-2-one |  | A | A |  |  | A | A |
| 3-diethoxyphosphinothioyloxy-4,4,5-trimethyl-tetrahydrofuran-2-one |  | A | A |  |  | A | A |

I claim as my invention:

1. A heterocyclic compound of the formula:

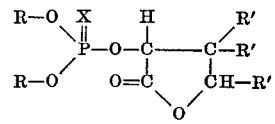

wherein:

(a) R' is a member of the group consisting of hydrogen and methyl,
(b) R is alkyl of from 1 to 6 carbon atoms,
(c) X is selected from the group consisting of oxygen and sulfur.

2. A compound of the formula:

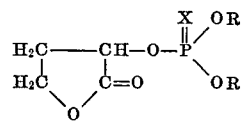

wherein X is a member selected from the group consisting of oxygen and sulfur, and R is lower alkyl.

3. A heterocyclic compound of the formula:

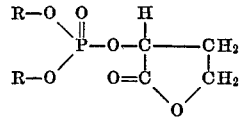

wherein each R is alkyl of from 1 to 6 carbon atoms.

4. 3-diethoxyphosphinothioyloxytetrahydrofuran-2-one.
5. 3-diethoxyphosphinyloxytetrahydrofuran-2-one.
6. 3 - diethoxyphosphinyloxy - 4,4,5 - trimethyltetrahydrofuran-2-one.
7. 3 - diethoxyphosphinothioyloxy - 4,4,5 - trimethyltetrahydrofuran-2-one.
8. A method of controlling insects which comprises contacting the insects with a toxic amount of a compound of the formula

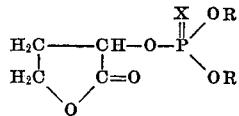

wherein X is a member selected from the group consisting of oxygen and sulfur, and R is lower alkyl.

References Cited

UNITED STATES PATENTS

| | | | |
|---|---|---|---|
| 2,598,803 | 6/1952 | Ladd et al. | 260—343.6 |
| 2,659,733 | 11/1953 | Folkers | 260—343.6 |
| 2,406,294 | 8/1946 | Hansen et al. | 167—33 |
| 2,418,458 | 4/1947 | Bousquet | 167—33 |

FOREIGN PATENTS

| | | |
|---|---|---|
| 510,817 | 5/1952 | Belgium. |
| 300,760 | 10/1954 | Switzerland. |

JAMES A. PATTEN, *Primary Examiner.*

U.S. Cl. X.R.

260—343.6, 343.9, 343.3, 343.5, 343, 343.2